United States Patent [19]
Hayashi

[11] Patent Number: 5,194,916
[45] Date of Patent: Mar. 16, 1993

[54] FLUORESCENCE SPECTROPHOTOMETER

[75] Inventor: Tsutomu Hayashi, Kyoto, Japan

[73] Assignee: Shimadzu Corporation, Kyoto, Japan

[21] Appl. No.: 755,732

[22] Filed: Sep. 6, 1991

[30] Foreign Application Priority Data

Sep. 28, 1990 [JP] Japan .................... 2-262003

[51] Int. Cl.$^5$ .................. G01J 3/443; G01N 21/64
[52] U.S. Cl. .................. 356/318; 250/458.1
[58] Field of Search .................. 356/318, 317, 417; 250/458.1, 459.1, 461.1, 461.2

[56] References Cited
PUBLICATIONS

Japanese Patent Abstract 01-295123, ABS GRP No:P1006 ABS vol. No: vol. 14, No. 78, ABS Pub Date: Feb. 14, 1990.

*Primary Examiner*—F. L. Evans
*Attorney, Agent, or Firm*—Oliff & Berridge

[57] ABSTRACT

The fluorescence spectrophotometer automatically sets the response time at the most suitable value for every sample, thus accurate quantitative measurements can be made with minimum measuring time. The response time characterizes the filtering operation by which noises are eliminated from the primary signal generated by the emission photometer. The fluorescence spectrophotometer sets the response time of the filtering operation based on the strength of the fluorescent light emitted from the measured sample.

10 Claims, 4 Drawing Sheets

FIG. 3

| STRENGTH OF FLUORESCENT LIGHT | RESPONSE TIME(sec) |
|---|---|
| 0 - 10 | 6 |
| 11 - 100 | 2 |
| 101 - 500 | 1 |
| 501 - 1000 | 0.5 | ps
FLUORESCENCE SPECTROPHOTOMETER

The present invention relates to a fluorescence spectrophotometer that automatically improves the S/N (signal to noise) ratio of the measured signal and can obtain accurate results in quantitative measurements.

BACKGROUND OF THE INVENTION

A fluorescence spectrophotometer generally includes a light source, an excitation monochromator (or a primary monochromator), a sample holding cell, an emission monochromator (or a secondary monochromator), a photometer and a signal processing circuit. An appropriate monochromatic light is selected by the excitation monochromator from the light generated by the light source, and the selected monochromatic light is irradiated onto a sample in the sample cell. There fluorescent light specific to the sample is generated in response to the irradiation. The fluorescent light is led to the emission monochromator, where a component light having a certain wavelength is selected. The strength of the selected fluorescent light is measured by the photometer. The measured strength is referred to an analytical curve to determine the content of a component of the sample. The analytical curve is prepared beforehand with standard samples having various known contents.

In a measurement of a fluorescence spectrophotometer, the output of the photometer is generally passed through a lowpass filter before using the output in determining the content value in order to eliminate noises from the output signal.

The lowpass filter is characterized by the response. When the lowpass filter is constructed by an analog circuit including a capacitor or an inductance, the response corresponds to the time constant $\tau$ of the lowpass filter. Of course, the lowpass filter can be constructed by a digital signal processing circuit (digital filter) or by a microcomputer with an appropriate filter program.

Noises in the output signal of the photometer are eliminated more effectively as the response value is set larger. But, as the response value becomes larger, the measurement time becomes longer. When the strength of the output signal of the photometer is large enough, it is unnecessary to set a large response value since the strength of the noise is relatively small (i.e., S/N ratio of the output signal is large enough). On the other hand, if the response value is set too small, the output signal of the photometer fluctuates and the content value of the sample determined from such output signal lacks reliability and accuracy.

Some conventional fluorescence spectrophotometers have an automatic response changing function. In those fluorescence spectrophotometers, however, the response is changed according to the wavelength scanning speed of the emission or excitation monochromator in order to prevent shift of the spectrum peak. When the fluorescence spectrophotometer is used in a quantitative measurement, the response is determined manually.

SUMMARY OF THE INVENTION

When the response value is set unchanged irrespective of the sample to be measured, the obtained content value of the sample can be inaccurate, as described before, if the fluorescent light emitted from the sample is weak. If the fluorescent light emitted from the sample is strong enough, on the other hand, the measurement takes an unnecessarily long time.

Thus the present invention is made to set the response value automatically at the most suitable value for the sample.

Accordingly, a fluorescence spectrophotometer of the present invention comprises:

a) excitation monochromatic light generating means for irradiating excitation monochromatic light onto a sample to be measured;

b) emission monochromator for selecting monochromatic light from fluorescent light emitted from the sample;

c) emission photometer for generating a primary output signal corresponding to the strength of the monochromatic light selected by the emission monochromator;

d) filtering means for eliminating noises from the primary output and for generating a secondary output, the filtering means being characterized by a response value;

e) determination means for determining a content of the sample based on the secondary output; and f) response setting means for setting the response value of the filtering means based on the primary output.

Instead of the above construction where the response setting means sets the response value based on the output of the emission photometer, the response setting means can use an output of a fluorescent light photometer which is provided separately from the emission photometer and measures the strength of the total fluorescent light from the sample, not the strength of the light after monochromated as the emission photometer measures in the above construction.

The filtering means can be constructed by either a digital signal processor (digital filter) or an analog lowpass filter circuit using a capacitor or an inductance. And the response value can be set by consulting a previously prepared reference table or using a continuous function.

BRIEF DESCRIPTION OF THE ATTACHED DRAWINGS

FIG. 3 is an example of the reference table stored in the digital signal processor of the fluorescence spectrophotometer.

DETAILED DESCRIPTION OF A PREFERRED EMBODIMENT

Figure 1:
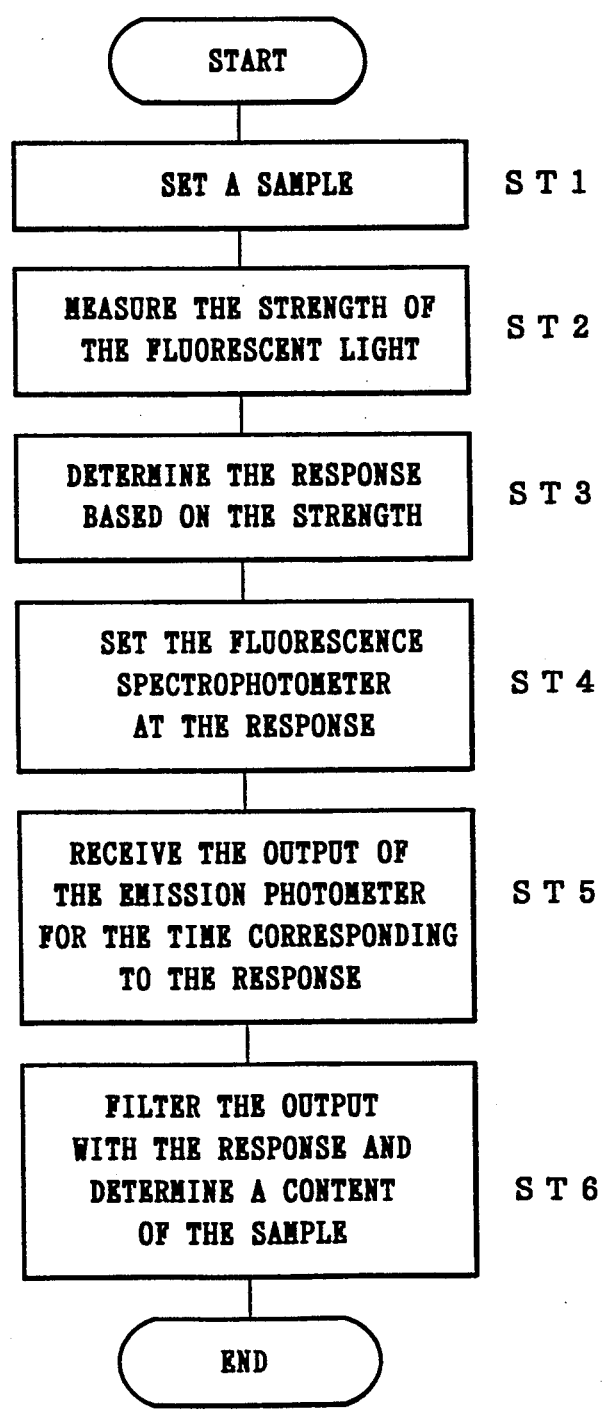
FIG. 1 is a flowchart of a quantitative measurement by a fluorescence spectrophotometer according to the present invention.
Figure 2:
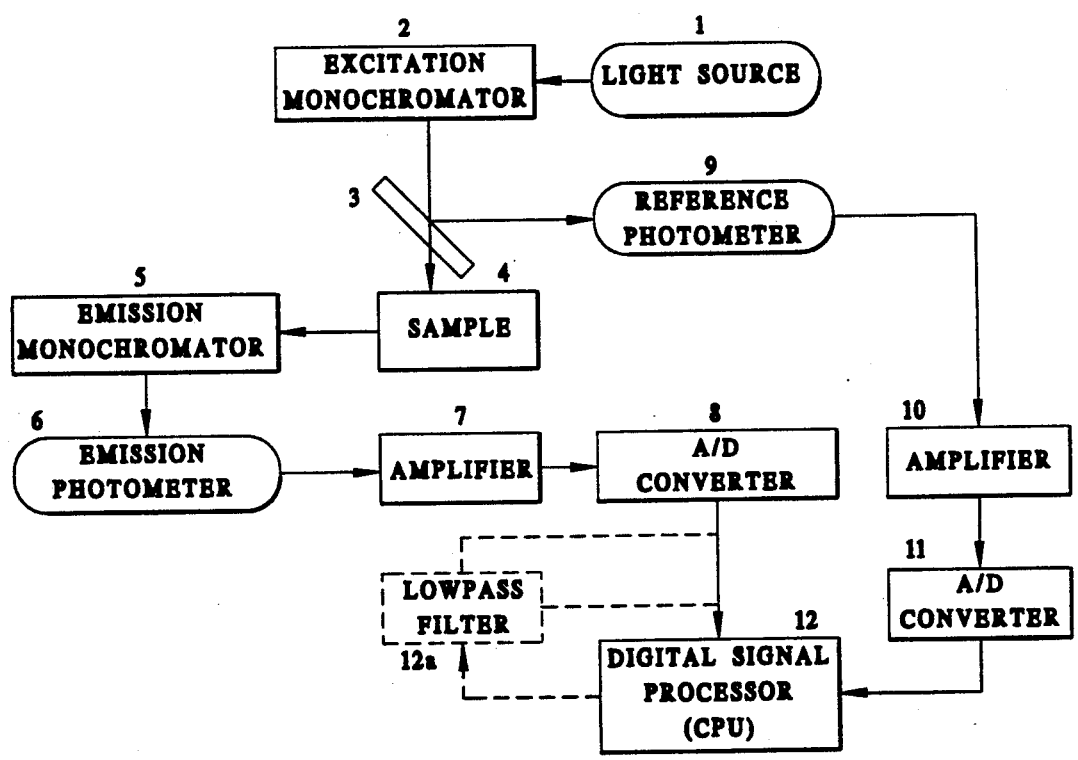
FIG. 2 is a block diagram showing the structure of the fluorescence spectrophotometer.

For better understanding of the invention, a preferred embodiment according to the present invention is now described referring to FIGS. 1 through 3. FIG. 2 is the block diagram showing the structure of a fluorescence spectrophotometer of the present embodiment. The fluorescence spectrophotometer includes: a light source 1, an excitation (or primary) monochromator 2, a beam splitter 3, an emission (or secondary) monochromator 5, an emission photometer 6, an emission amplifier 7, an emission A/D (analog to digital) converter 8, a reference photometer 9, a reference amplifier 10, a reference A/D converter 11, and a digital signal processor (CPU) 12.

Light from the light source 1 is monochromated by the excitation monochromator 2: that is, monochromatic excitation light having an appropriate wavelength is selected from the light from the light source 1. The beam splitter 3 splits the monochromatic excitation light into two directions: one going to a sample 4 and the other going to the reference photometer 9.

When the sample 4 is irradiated by the monochromatic excitation light, the sample 4 generates fluorescent light specific to the sample. The emission monochromator 5 selects an appropriate monochromatic emission light from the fluorescent light generated by the sample 4, and the strength of the selected monochromatic emission light is measured by the emission photometer 6. The output (primary output) of the emission photometer 6 corresponding to the strength of the monochromatic emission light is amplified by the amplifier 7, converted into digital signal by the A/D converter 8, and then given to the CPU 12.

Figure 2A:
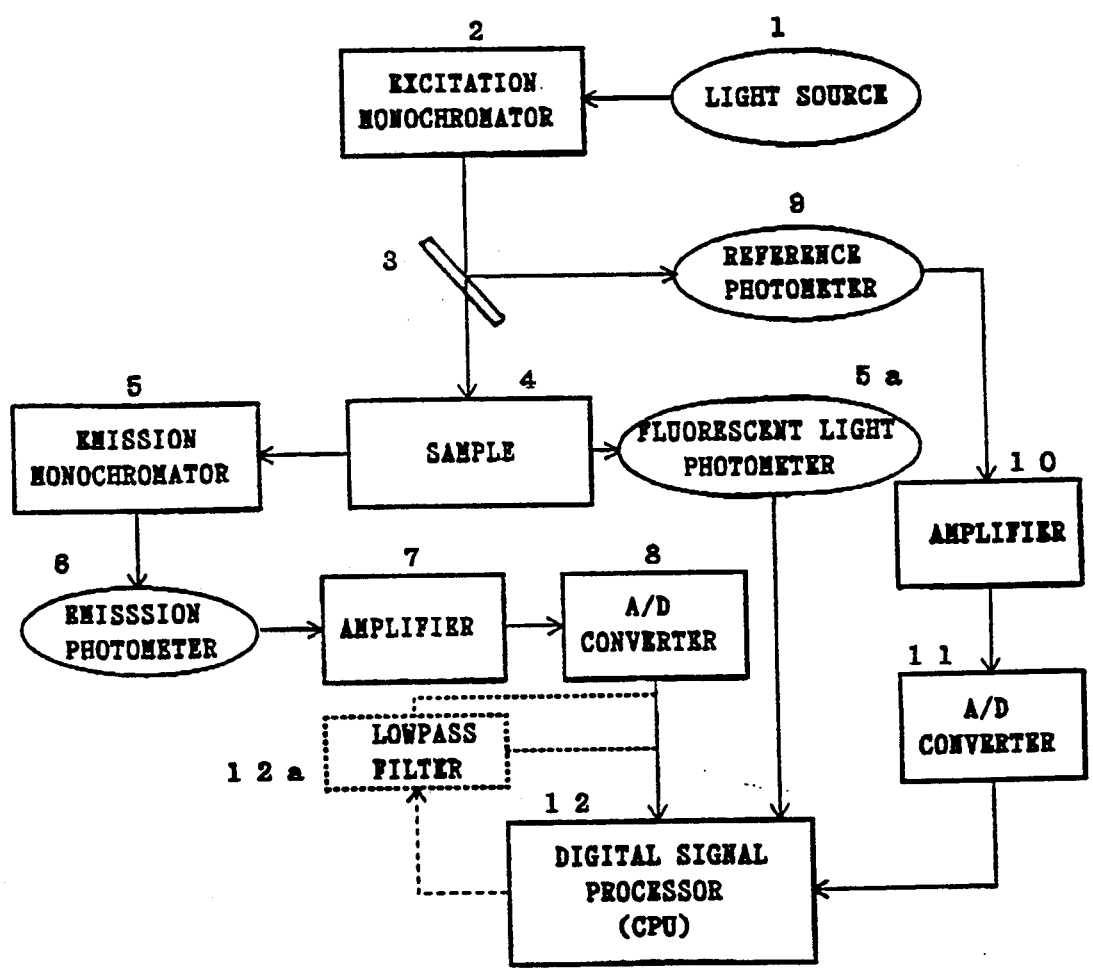
FIG. 2A is a block diagram showing the structure of the fluorescent spectrophotometer using a fluorescent light photometer.

Alternatively, instead of the above construction where the response setting means sets the response value based on the output of the emission photometer 6, the response setting means can use an output of a fluorescent light photometer 5a, as shown in FIG. 2A, which measures the strength of the total fluorescent light from the sample 4, not the strength of the light after the light has been made monochromatic by the emission monochromator.

The reference photometer 9 measures the other half of the monochromatic excitation light split by the beam splitter 3, and generates a reference signal corresponding to the strength. Since the strengths of the two beams split by the beam splitter 3 are always proportional, the reference signal is proportional to the strength of monochromatic excitation light irradiated onto the sample 4. The reference signal is also amplified by the amplifier 0, converted into digital signal by the A/D converter 11, and given to the CPU 12.

The CPU 12 has a filtering function and a content determination function. In filtering function the CPU 12 acts like a digital filter which is characterized by a response value. If the filtering function is realized, not in the CPU 12, by an analog lowpass filter circuit 12a (shown in dotted lines) provided before the A/D converter 8, the time constant r of the lowpass filter corresponds to the response value. The content determination function is to determine the content of a component of the sample 4. In determining the content value, the CPU 12 divides the filtered primary signal (secondary signal) by the reference signal, by which fluctuation or change in the strength of the light from the light source 1 is compensated.

In the CPU 12, a table of data as shown in FIG. 3 is stored. The table (reference table or lookup table) includes strength data of the primary signal and the corresponding response data which are determined beforehand through experiments. In the present embodiment, the table determines four data of response values for the strength value of 0–1000 (the unit is arbitrary).

The table can be replaced by a mathematical function between the strength s and response r. In this case, a preferable expression of the function is $$r = c \cdot s^{-\frac{1}{2}},$$

where c is a constant, because the S/N ratio of a signal improves proportional to the square root of the strength of the signal.

The quantitative measurement with an automatic response setting of the fluorescence spectrophotometer of the present embodiment is now described referring to the flowchart of FIG. 1. First, at step ST1, a sample to be measured is set on a sample holding cell (not shown in FIG. 2). Then the strength of the fluorescent light emitted from the sample is measured by the emission photometer 6 at step ST2. Based on the measured strength, the CPU 12 determines the corresponding response value by consulting the table stored there at step ST3. If, for example, the strength of the fluorescent light of the sample is 25, the response value is determined as 2 seconds as shown in FIG. 3. Then, at step ST4, the fluorescence spectrophotometer (specifically, the CPU 12) is set at the response value thus determined.

The CPU 12 receives data from the emission photometer 6 for the time corresponding to the response value at step ST5. Based on the data thus collected, the CPU 12 filters the data using the response value set at step ST4, and determines a content value of a component of the sample at step ST6.

As seen from the table of FIG. 3, if the fluorescent light from the sample is strong enough, the data collecting time is short, and the quantitative analysis by the fluorescence spectrophotometer of the present embodiment can be finished in a short time. If the fluorescent light from the sample is not so strong, on the other hand, the response value is adequately increased to compensate for the poor S/N ratio of the primary signal and an accurate quantitative analysis is assured.

The measurement procedure of the fluorescence spectrophotometer of the present embodiment is thus easy so that even a novice can handle it and obtain accurate quantitative value.

In the above embodiment, the response value is determined according to the strength of the fluorescent light of the sample. If the sensitivity of the fluorescence spectrophotometer is variable, the table as shown in FIG. 3 may be changed according to the setting of the sensitivity. Alternatively, after measuring the S/N ratio of the primary signal, the response value can be determined according to the S/N ratio.

What is claimed is:

1. A fluorescence spectrophotometer comprising:
   a) excitation monochromatic light generating means for irradiating excitation monochromatic light onto a sample to be measured;
   b) emission monochromator for selecting monochromatic light from fluorescent light emitted from the sample;
   c) emission photometer for generating a primary output signal corresponding to the strength of the monochromatic light selected by the emission monochromator;
   d) filtering means for eliminating noises from the primary output and for generating a secondary output, the filtering means being characterized by a response value;
   e) determination means for determining a content of the sample based on the secondary output; and
   f) response setting means for setting the response value of the filtering means based on the primary output.

2. A fluorescence spectrophotometer as claimed in claim 1, where the filtering means is a digital signal processor in which the filtering is performed on a plurality of output data of the emission photometer.

3. A fluorescence spectrophotometer as claimed in claim 2, where the response setting means sets the response value by consulting a previously prepared reference table.

4. A fluorescence spectrophotometer as claimed in claim 2, where the response setting means sets the response value by using a previously prepared function.

5. A fluorescence spectrophotometer as claimed in claim 1, where the filtering means is an analog lowpass filter circuit.

6. A fluorescence spectrophotometer comprising:
a) excitation monochromatic light generating means for irradiating excitation monochromatic light onto a sample to be measured;
b) emission monochromator for selecting monochromatic light from fluorescent light emitted from the sample;
c) emission photometer for generating a primary output signal corresponding to the strength of the monochromatic light selected by the emission monochromator;
d) filtering means for eliminating noises from the primary output and for generating a secondary output, the filtering means being characterized by a response value;
e) determination means for determining a content of the sample based on the secondary output;
f) fluorescent light photometer for measuring the strength of the fluorescent light from the sample; and
g) response setting means for setting the response value of the filtering means based on the output of the fluorescent light photometer.

7. A fluorescence spectrophotometer as claimed in claim 6, where the filtering means is a digital signal processor in which the filtering is performed on a plurality of output data of the emission photometer.

8. A fluorescence spectrophotometer as claimed in claim 7, where the response setting means sets the response value by consulting a previously prepared reference table.

9. A fluorescence spectrophotometer as claimed in claim 7, where the response setting means sets the response value by using a previously prepared function.

10. A fluorescence spectrophotometer as claimed in claim 6, where the filtering means is an analog lowpass filter circuit.

* * * * *